US011507672B1

(12) United States Patent
Pagnozzi et al.

(10) Patent No.: US 11,507,672 B1
(45) Date of Patent: Nov. 22, 2022

(54) RUNTIME FILTERING OF COMPUTER SYSTEM VULNERABILITIES

(71) Applicant: Sysdig, Inc., San Francisco, CA (US)

(72) Inventors: Mattia Pagnozzi, Milan (IT); Luca Guerra, Milan (IT); Guido Bonomi, Milan (IT)

(73) Assignee: SYSDIG, INC., San Francisco, CA (US)

( * ) Notice: Subject to any disclaimer, the term of this patent is extended or adjusted under 35 U.S.C. 154(b) by 0 days.

(21) Appl. No.: 17/574,423

(22) Filed: Jan. 12, 2022

(51) Int. Cl.
*G06F 21/57* (2013.01)
*G06F 8/65* (2018.01)
*H04L 9/40* (2022.01)

(52) U.S. Cl.
CPC .............. *G06F 21/577* (2013.01); *G06F 8/65* (2013.01); *H04L 63/0263* (2013.01); *G06F 2221/033* (2013.01)

(58) Field of Classification Search
CPC .... G06F 21/577; G06F 8/65; G06F 2221/033; H04L 63/0263
See application file for complete search history.

(56) References Cited

U.S. PATENT DOCUMENTS

| 9,916,233 | B1 | 3/2018 | Qureshi et al. |
| 10,592,380 | B2 | 3/2020 | Borello |
| 10,606,646 | B1* | 3/2020 | Christensen .......... G06F 9/5016 |
| 10,922,072 | B1* | 2/2021 | Chouinard ............. G06F 8/656 |
| 2009/0165132 | A1* | 6/2009 | Jain ...................... G06F 21/554 726/22 |
| 2011/0138389 | A1* | 6/2011 | Molnar ............... G06F 11/3466 718/100 |

(Continued)

FOREIGN PATENT DOCUMENTS

WO    WO 2018/160744 A1    9/2018

OTHER PUBLICATIONS

European Patent Office, "Search Report" in application No. PCT/US2019/028319, dated Jul. 8, 2019, 15 pages.

(Continued)

*Primary Examiner* — Jason Chiang
(74) *Attorney, Agent, or Firm* — Hickman Becker Bingham Ledesma LLP (57) ABSTRACT

Techniques for selectively remediating vulnerabilities for assets of a computing system is disclosed. The vulnerability management system identifies "active" vulnerabilities associated with "active" computing assets that have been determined to be currently running, or to have been recently run, on the system using system call data. By limiting remediation to vulnerabilities associated with software packages of active computing assets, remediation/mediation efforts can be focused on vulnerabilities that may be currently exploited for the system. The list of active vulnerabilities identified for a system may be updated in real time based on continued monitoring of runtime operations of the system. Additional context metadata may be associated with the active vulnerabilities to allow for further prioritization of vulnerability management activities. Vulnerability management actions for particular active vulnerability may include updating a software package, adjusting a set of firewall rules, communicating with a client computing device, and displaying vulnerability information in a GUI.

21 Claims, 7 Drawing Sheets

(56) References Cited

U.S. PATENT DOCUMENTS

| | | | | |
|---|---|---|---|---|
| 2014/0013434 | A1* | 1/2014 | Ranum | H04L 67/10 726/24 |
| 2014/0115703 | A1* | 4/2014 | Penton | G06F 21/554 726/23 |
| 2015/0244734 | A1* | 8/2015 | Olson | G06F 21/577 726/25 |
| 2016/0099960 | A1* | 4/2016 | Gerritz | H04L 63/145 726/23 |
| 2016/0205002 | A1* | 7/2016 | Rieke | H04L 43/04 709/224 |
| 2016/0357618 | A1 | 12/2016 | Degioanni et al. | |
| 2017/0098072 | A1* | 4/2017 | Stopel | G06F 21/53 |
| 2018/0048545 | A1 | 2/2018 | Mishalov | |
| 2018/0183764 | A1* | 6/2018 | Gunda | H04L 63/0254 |
| 2018/0295036 | A1* | 10/2018 | Krishnamurthy | G06F 11/30 |
| 2018/0357068 | A1* | 12/2018 | Ambichl | G06F 9/545 |
| 2018/0359264 | A1* | 12/2018 | Sweet | H04L 63/0853 |
| 2019/0311130 | A1* | 10/2019 | Hodgman | H04L 63/1433 |
| 2019/0324882 | A1* | 10/2019 | Borello | G06F 9/545 |
| 2020/0174905 | A1 | 6/2020 | Borello | |
| 2020/0265134 | A1* | 8/2020 | Cristina | G06F 8/60 |
| 2020/0396240 | A1* | 12/2020 | Flaherty | G06N 20/20 |
| 2021/0042217 | A1* | 2/2021 | Hwang | G06F 11/3604 |
| 2021/0089647 | A1* | 3/2021 | Suwad | G06F 21/52 |
| 2021/0097037 | A1* | 4/2021 | Babol | G06F 9/5077 |
| 2021/0144168 | A1* | 5/2021 | Vester | G06F 9/451 |
| 2021/0192046 | A1* | 6/2021 | Levin | G06F 9/5027 |
| 2021/0211450 | A1* | 7/2021 | Aleidan | H04L 63/1441 |
| 2021/0226981 | A1* | 7/2021 | Huffman | G06F 21/577 |
| 2021/0344703 | A1* | 11/2021 | Barajas | G06F 16/2246 |
| 2022/0138079 | A1 | 5/2022 | Borello | |

OTHER PUBLICATIONS

European Claims in application No. PCT/US2019/028319, dated Jul. 2019, 4 pages.

Berger, Andreas, "Dynatrace Application Security protects your applications in complex cloud environments", Dynatrace news, Dec. 8, 2020, 18 pages.

"What is Kubernetes?", https://kubernetes.io/docs/concepts/overview/what-is-kubernetes/, last modified Jul. 23, 2021, 4 pages.

"Vulnerability Management", Sysdig, Sysdig Secure, Feature Brief, https://sysdig.com/wp-content/uploads/2019/01/vulnerability-management.pdf, 2019, 2 pages.

"Runtime vulnerability detection", Dynatrace Hub, https://www.dynatrace.com/hub/detail/runtime-vulnerability-detection/, printed Dec. 13, 2021, 1 page.

"Pods", Kubernates, https://kubernetes.io/docs/concepts/workloads/pods/, last modified Oct. 17, 2021, 6 pages.

* cited by examiner

RUNTIME FILTERING OF COMPUTER SYSTEM VULNERABILITIES

RELATED APPLICATIONS

The present application is related to U.S. Pat. No. 10,592,380, titled "Programmatic Container Monitoring", filed Apr. 20, 2018, and issued Mar. 17, 2020, the entire contents of which are hereby incorporated by reference as if fully set forth herein.

FIELD OF THE DISCLOSURE

The present disclosure relates to the technical area of computer vulnerability management. The disclosure relates more specifically to selectively managing computer vulnerabilities based on runtime information for the system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software may be associated with vulnerabilities that expose applications of a computing system that utilize the software to the threat of vulnerability exploitation, which compromises the security of the system. Known resource vulnerabilities are published, e.g., by a vulnerabilities feed, in association with software package identifiers (including package versions) that are affected by the respective vulnerabilities. A vulnerability management system can scan an image of an application to identify a list of software packages that are associated with executable files, which have the potential of compromising a computer system that runs the application. Depending on the complexity and variety of applications on a computing system, any given computing system may be subject to hundreds or thousands of known vulnerabilities at a time. Given the limited computing resources that are generally able to be dedicated to addressing vulnerabilities, remediation of the known vulnerabilities is to be selectively performed for prioritized vulnerabilities.

One way to prioritize a system's vulnerabilities is using vulnerability metadata, such as severity, attack type, or availability of a solution. However, this technique may not be sufficient to effectively manage vulnerability remediation since there may still be a large number of vulnerabilities that are associated with prioritized metadata values. Furthermore, vulnerability metadata does not reflect how likely the vulnerabilities are to be exploited within a particular system. Another way to prioritize vulnerability management is using configuration data determined for the applications that are associated with the vulnerabilities. Such application configuration data may be explicitly indicated by an administrator of the system, or may be derived from application data. For example, vulnerabilities that are associated with an application that is determined to be network-facing based on a set of firewall rules for the application may be prioritized for remediation.

Even using vulnerability metadata and application configuration data to prioritize known vulnerabilities of a computer system, a large number of vulnerabilities may still be identified as prioritized for remediation, and the prioritized vulnerabilities may not be those that are most likely to be exploited for a given system. Thus, it would be beneficial to provide an improved vulnerability management system that allows for further filtering of the vulnerabilities of a computing system for more efficient remediation.

BRIEF DESCRIPTION OF THE DRAWINGS

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

In the drawings.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Embodiments are described herein according to the following outline:

1.0 General Overview
2.0 Example Computing Environment
3.0 Example Computer Components
4.0 Active Software Package Identification
   4.1 Active Software Package Identification Using Computing Asset Data
   4.2 Active Software Package Identification Using System Call Argument Data
   4.3 Active Software Package Identification Using Container Data
   4.4 Real-Time Updates of Active Vulnerabilities
5.0 Filtered Vulnerability Management Actions
   5.1 Targeted Software Package Updates
   5.2 Targeted Security Measures
   5.3 Targeted Vulnerability Communication
   5.4 Graphical User Interface with Active Vulnerability Filtering 6.0 Computer Component Background
6.1 Containers
6.2 Monitoring Component
7.0 Implementation Example—Hardware Overview
8.0 Extensions and Alternatives

1.0 General Overview

A vulnerability management system for selectively remediating known vulnerabilities for computing assets of a computing system and related methods are disclosed. Computing assets of a computing system may include host applications and/or containerized applications available for execution by the system. The vulnerability management system is programmed or configured to identify "active" vulnerabilities associated with "active" computing assets, namely computing assets that have been determined to be currently running, or to have been recently run, on the computing system. The vulnerability management system is further programmed or configured to mark the identified vulnerabilities as "active", and, according to various embodiments, to associate further context metadata of the associated computing asset with the identified vulnerabilities to allow selective remediation of the known system vulnerabilities.

Active vulnerabilities of a computing system are identified based on runtime operations detected for the system. For example, system calls within a kernel space of the system are detected, where computing assets associated with the processes that performed the detected system calls are considered to be active. By limiting remediation to vulnerabilities associated with software packages of active computing assets, remediation/mediation efforts can be focused on vulnerabilities that may be currently exploited for the system. A software package may be or include a library that is linked to an executable file, or may be or include an executable file. The list of active vulnerabilities identified for a system may be updated in real time based on continued monitoring of runtime operations of the system.

Furthermore, additional context metadata may be associated with the active vulnerabilities of the system to allow for further prioritization of vulnerability management activities. For example, active computing assets may be managed using any number of encapsulating entities, e.g., containers, container pods, pod clusters, cloud deployments, etc. Each encapsulating entity may be associated with metadata that may be used to filter the active vulnerabilities that are prioritized for remediation.

Vulnerability management actions for vulnerability remediation, which may be taken to address a particular active vulnerability, include: applying one or more updates to a particular software package associated with the particular active vulnerability; adjusting a set of firewall rules, for the particular computing system, to prevent exploitation of the particular active vulnerability; sending information identifying the particular active vulnerability to a client computing device; and including information identifying the particular active vulnerability in a graphical user interface.

The vulnerability management system has many technical benefits. Focusing vulnerability management actions on active vulnerabilities of a computing system increases the security of the computing system. Exploitation of vulnerabilities can incapacitate a computing system, and addressing vulnerabilities is an important measure to maintain proper functioning of the computing system. Furthermore, prioritizing management of these active vulnerabilities focuses computing resources on vulnerabilities that are most likely to be exploited. Generally, remediation of vulnerabilities that are associated with only non-active computing assets may safely be delayed, which reduces the overall amount of computing resources required to perform vulnerability management.

2.0 Example Computing Environment

Figure 1:
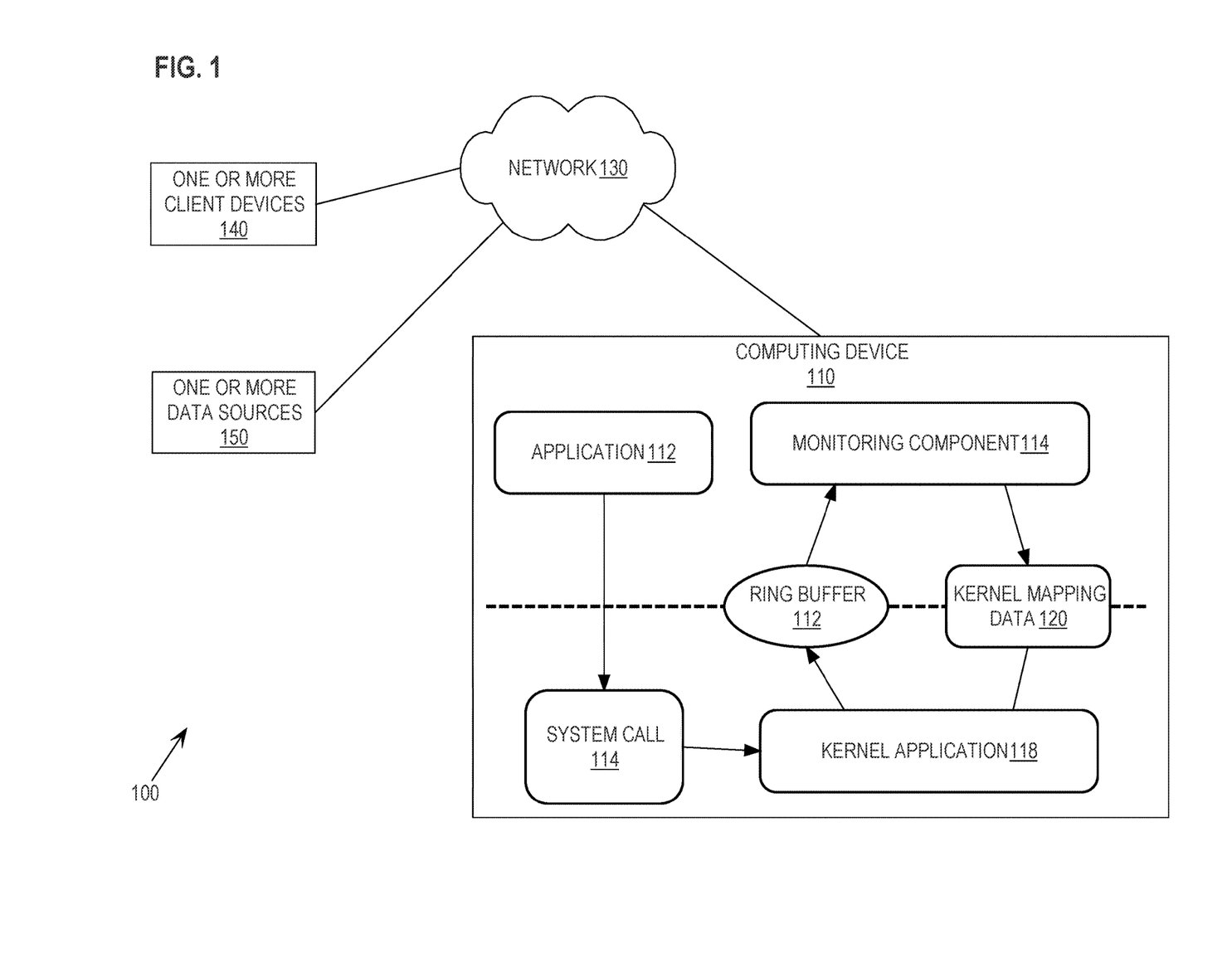
FIG. 1 depicts an example computing architecture for a computing system that is configured to identify and perform vulnerability management actions for active vulnerabilities for the system.

According to various embodiments, a vulnerability management system identifies a set of "active" vulnerabilities for a computing system, e.g., based on runtime information such as system calls that are detected using a monitoring component running on the system. To illustrate, FIG. 1 depicts an example computing architecture for a computing system 100 (comprising one or more computing devices) that is configured to identify and perform vulnerability management actions for active vulnerabilities for the system.

Example computing system 100 comprises a computing device 110, one or more client devices 140, and one or more data sources 150 that are communicatively coupled directly or indirectly via one or more networks 130.

In some embodiments, the computing device 110 broadly represents one or more computers, and/or virtual computing instances that are programmed or configured with data structures and/or database records that are arranged to host or execute functions including but not limited to collecting runtime data, identifying active software packages, and determining a list of active vulnerabilities for the computing device. The computing device 110 can comprise a server farm, a cloud computing platform, a parallel computer, or any other computing facility with sufficient computing power in data processing, data storage, and network communication for the above-described functions.

In some embodiments, each of the one or more data sources 150 is programmed to provide data for computing device 110, such as cloud data or a vulnerabilities database as described in further detail herein. Each of the third-party data sources 122 can comprise a server farm, a cloud computing platform, or a parallel computer, may comprise a desktop computer, laptop computer, tablet computer, smartphone, or wearable device, or may comprise any other type of computing device with sufficient computing power in data processing, data storage, and network communication for the above-described functions.

In some embodiments, each of the one or more client devices 140 is programmed to submit requests, which can be related to vulnerabilities management, and process the replies to the requests. Each of the one or more client devices 140 may comprise a desktop computer, laptop computer, tablet computer, smartphone, wearable device, or any other type of computing device with sufficient computing power in data processing, data storage, and network communication for the above-described functions.

The network 130 may be one or more networks implemented by any medium or mechanism that provides for the exchange of data between the various elements of FIG. 1. Examples of network 130 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

Example computing device 110 comprises a plurality of computing assets, such as containerized applications and/or host applications. Computing assets may have dependencies on one or more software packages that can be included in, or associated with, images of the computing assets. A computing asset has a dependency on a software package when the asset uses software in the package; such a software package is associated with an executable file (an "executable") within an image of the computing asset.

According to various embodiments, computing device 110 maintains one or more Software Bills of Materials (SBOM), which describe computing assets installed on computing device 110. A computing asset that is installed on computing device 110 is accessible to computing device 110 such that computing device 110 is able to run executables for the computing asset. An SBOM includes information identifying dependencies of the assets including any software packages that are accessible to and/or used by each listed computing asset, and versions of the identified software packages, etc.

Computing device 110 comprises an example monitoring component 114 (e.g., within a user space of the system) that communicates with one or more processes, such as kernel application 118, running in a kernel space of the computing system. Monitoring component 114 is configured to identify runtime information for computing device such as system calls made within the kernel space of device 110, as described in further detail herein, which are used to identify computing assets that are currently active within the system. For example, at run time, when a computing asset (such as an application 112 that may be a containerized application or a host application of computing device 110) makes a system call 114, kernel application 118 stores trace data for the system call, including arguments for the system call 114, in a data structure that is accessible by monitoring component 114, e.g., ring buffer 112. As another example, at run time, a monitoring component 114 of device 110 retrieves, e.g., from ring buffer 112, information for a container that is associated with a process that made a system call within the device. On a near-continuous basis (e.g., every few milliseconds), the monitoring component 114 uses runtime information to identify processes running within the device and map the processes to software packages, as described in further detail below.

3.0 Example Computer Components

Figure 2:
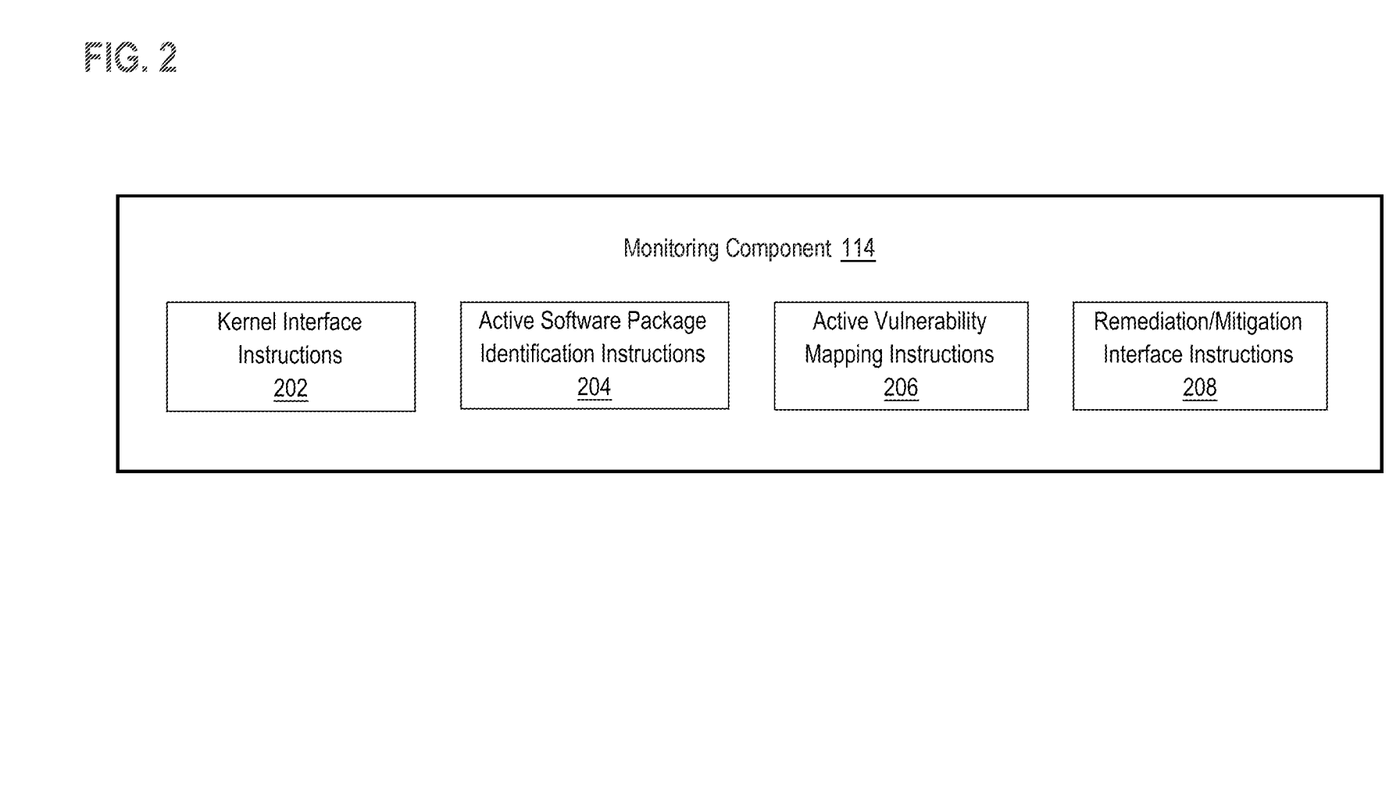
FIG. 2 depicts example computer modules of a monitoring component.

FIG. 2 illustrates example computer modules of the monitoring component 114. This figure is for illustration purposes only and the monitoring component can comprise fewer or more functional components. A component may or may not be self-contained. Depending upon implementation-specific or other considerations, the components may be centralized or distributed functionally or physically.

According to various embodiments, the monitoring component 114 comprises kernel interface instructions 202, active software package identification instructions 204, active vulnerability mapping instructions 206, and user interface instructions 208.

A kernel interface implemented using instructions 202 allows the monitoring component to detect one or more currently-running processes running on computing device 110. According to various embodiments, the monitoring component receives trace information, from a kernel process, regarding system call events by computing assets of computing device 110. The trace information retrieved for a particular system call event includes a process identifier and parameters of the system call. An active software package identifier implemented using instructions 204 uses either computing asset data (e.g., SBOM data) or system call argument data to identify active software packages associated with the processes associated with the detected system calls. An active vulnerability mapper implemented using instructions 206 uses a vulnerabilities database to identify active vulnerabilities that are associated with the active software packages. Furthermore, a remediation interface implemented using instructions 208 causes vulnerability management actions to be taken for active vulnerabilities.

4.0 Active Software Package Identification

Figure 3A:
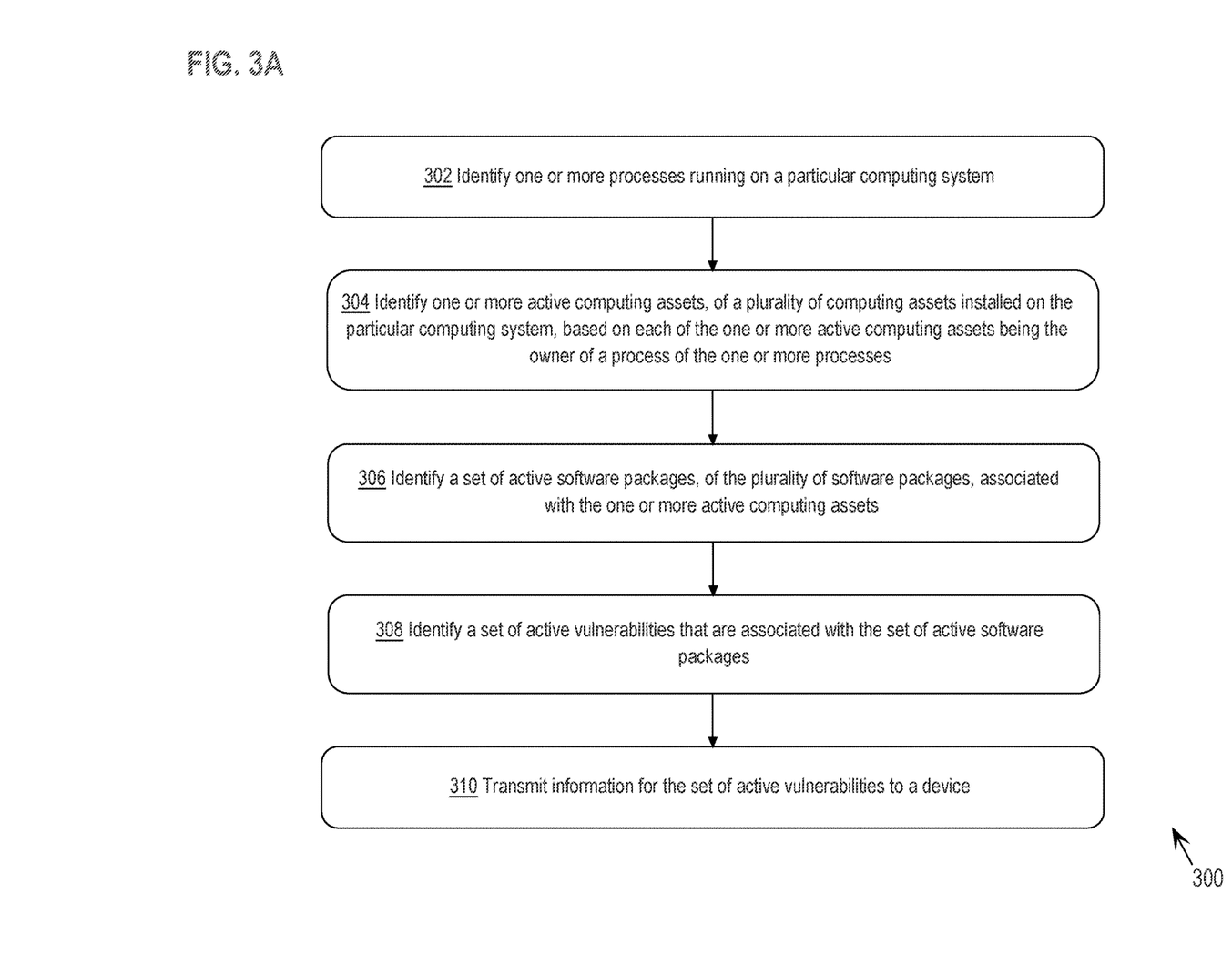
FIG. 3A depicts an example flowchart for using computing asset data to identify active vulnerabilities for a computing system.
Figure 3B:
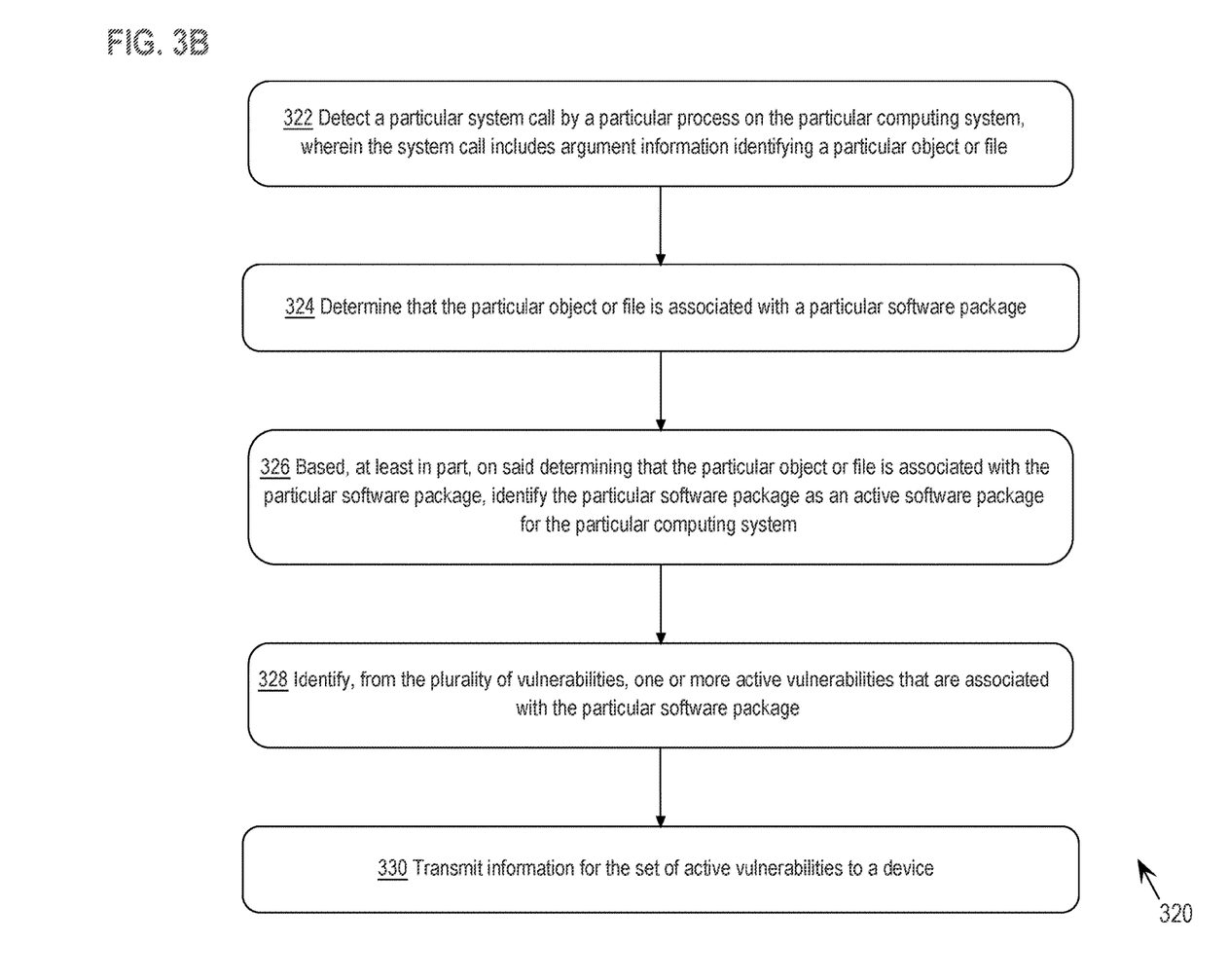
FIG. 3B depicts an example flowchart for using system call argument data to identify active vulnerabilities for a computing system.

FIGS. 3A and 3B depict example flowcharts 300 and 320 for identifying active vulnerabilities for a given computing system based on system calls detected within the system. FIGS. 3A and 3B are each shown in a simplified, schematic format for purposes of illustrating a clear example and other embodiments may include more, fewer, or different elements connected in various manners. Each of these figures is intended to disclose an algorithm, plan or outline that can be used to implement one or more computer programs or other software elements that, when executed, cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

4.1 Active Software Package Identification Using Computing Asset Data

FIG. 3A depicts an example flowchart 300 for using computing asset data (e.g., based on an SBOM) to identify active vulnerabilities that are associated with one or more active software packages for a given computing system. At step 302 of flowchart 300, one or more processes running on a particular computing system are identified. For example, monitoring component 114 retrieves, e.g., from ring buffer 112, trace information indicating that a system call 114 was initiated in the kernel space of device 110. This information includes process information, such as a process identifier. As a further example, one or more host processes running on the computing system may be identified by requesting a list of running processes from an operating system (e.g., using the ps command).

At step 304 of flowchart 300, one or more active computing assets, of a plurality of computing assets installed on the particular computing system, are identified based on each of the one or more active computing assets being the owner of a process of the one or more processes. For example, one or more kernel processes of device 110 maintain, e.g., in kernel mapping data 120, mapping data that maps process identifiers to executable filepaths that identify executables of the computing assets that "own" the respective processes. Using mapping data 120, one or more "active" executables mapped to the one or more processes are identified. Each executable may be considered a computing asset. A running process may have one or more parent or source processes. In this case, each parent process of an identified process may be used to identify an associated computing asset, e.g., for purposes of obtaining context metadata for vulnerabilities that are associated with the process. According to various embodiments, system calls are selected for analysis based on configuration information, e.g., based on the system call type. To illustrate, system calls such as brk can be skipped for lack of relevant information, while execve system calls are selected for analysis because of their relevance to identifying active computing assets.

At step 306 of flowchart 300, a set of active software packages, of the plurality of software packages, associated with the one or more active computing assets is identified. For example, information identifying the set of active executables is compared to SBOM data maintained by the computing system. As indicated above, the SBOM data identifies dependencies of the computing assets installed on the computing system. The set of active software packages comprises the software packages listed as dependencies, in the SBOM data, for the one or more active executables.

At step 308 of flowchart 300, a set of active vulnerabilities that are associated with the set of active software packages are identified. For example, device 110 has access to a vulnerabilities database that maps identifiers (e.g., Common Platform Enumerations (CPEs)) of known vulnerabilities to software package identifiers (which includes package versions). A vulnerabilities database may be implemented in any way. Based on the vulnerabilities database, device 110 uses the identified set of active software packages to identify a set of "active" vulnerabilities for the system, which are those vulnerabilities that are mapped to the set of active software packages in the vulnerabilities database.

At step 310 of flowchart 300, information for the set of active vulnerabilities is transmitted to a device for monitoring, auditing, and/or vulnerabilities management.

4.2 Active Software Package Identification Using System Call Argument Data

FIG. 3B depicts an example flowchart 320 for using software package identification information in system calls to identify active vulnerabilities for a computing system. Specifically, at step 322 of flowchart 320, a particular system call by a particular process is detected on the particular computing system, wherein a particular software package may be identified based on information for the system call. For example, monitoring component 114 retrieves, e.g., from ring buffer 112, trace information indicating that a system call 114 was initiated in the kernel space of device 110 and argument data for system call 114, where the trace information for system call 114 provides evidence of use of a particular software package that is identifiable via an argument of the system call.

At step 324 of flowchart 320, the particular software package is identified as an active software package for the particular computing system based, at least in part, on the reference to the particular software package in the particular system call. To illustrate, device 110 detects an mmap system call that maps an identified file or device into memory, where the mapped object may be identified based on the arguments of the system call. If the mapped object is determined to be part of a software package, then the system call information is used to directly identify the software package as an "active" software package for the system. As another example, device 110 detects an execve system call that executes an executable file that is identified based on a pathname in the arguments of the system call. Based on this system call, the identified executable file is identified as an "active" software package.

At step 326 of flowchart 320, one or more active vulnerabilities that are associated with the particular software package are identified from the plurality of vulnerabilities. For example, based on a vulnerabilities database, the identified software package is used to identify one or more active vulnerabilities for the computing system, which are vulnerabilities that are mapped to the particular software packages in the vulnerabilities database.

At step 328 of flowchart 320, information for the set of active vulnerabilities is transmitted to a device for monitoring, auditing, and/or vulnerabilities management.

According to various embodiments, the particular system call is also analyzed using computing asset data (e.g., SBOM data) described above to determine a computing asset associated with a process that made the system call, and potentially to identify any other software packages that are dependencies of an executable file that is the owner of the process that made the system call. Using the SBOM to determine a computing asset associated with a process that made the system call allows for context metadata to be identified for the computing asset, e.g., regarding encapsulating entities of the computing asset, and recorded for any active vulnerabilities identified based on the system call, as described in further detail below.

4.3 Active Software Package Identification Using Container Data

Figure 3C:
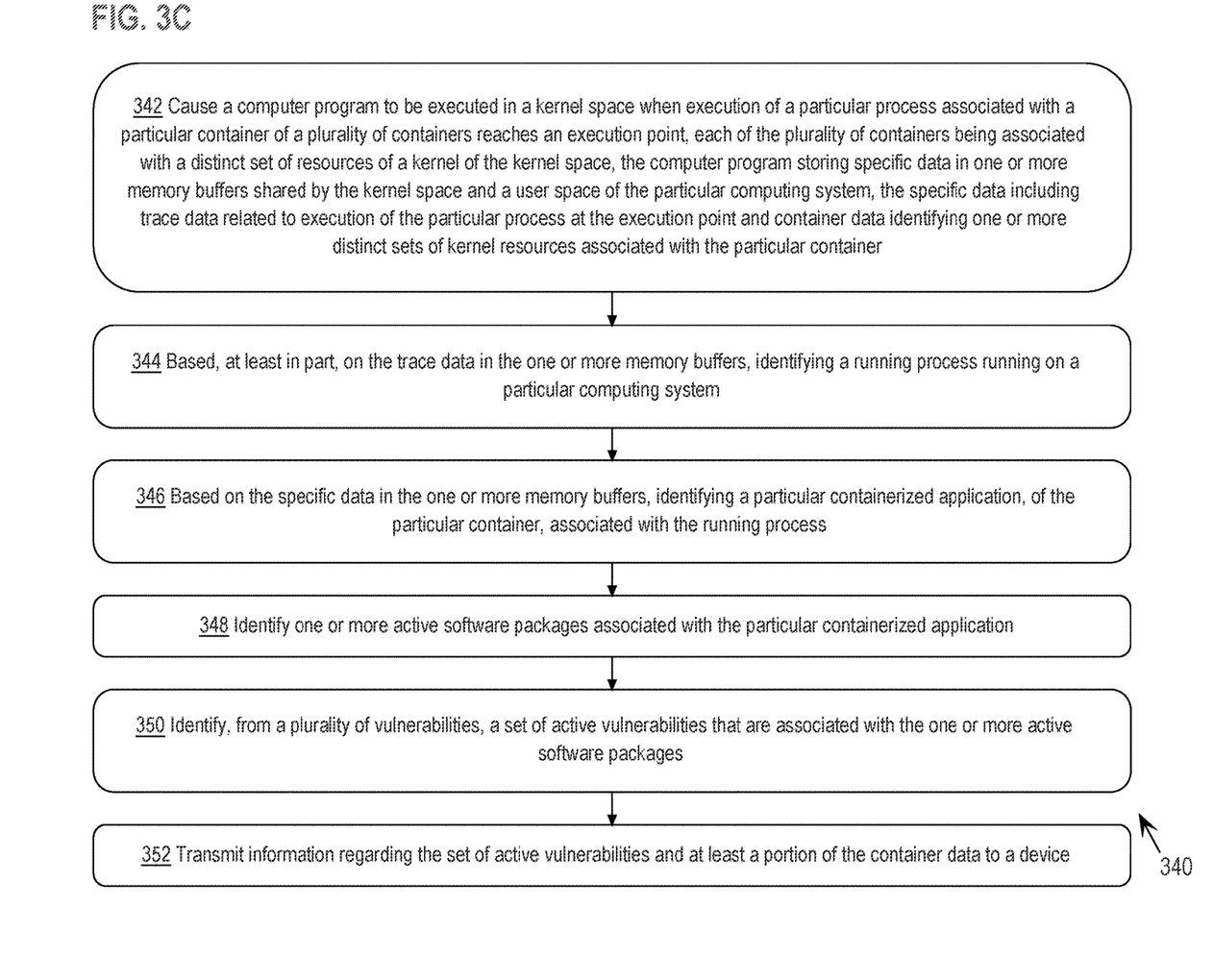
FIG. 3C depicts an example flowchart for using container data, generated by a kernel process, to identify a containerized application for a running process.

FIG. 3C depicts an example flowchart 340 for using container data, generated by a kernel process, to identify a containerized application for a running process. Specifically, at step 342, a computer program is caused to be executed in a kernel space when execution of a particular process associated with a particular container of a plurality of containers reaches an execution point, each of the plurality of containers being associated with a distinct set of resources of a kernel of the kernel space, the computer program storing specific data in one or more memory buffers shared by the kernel space and a user space of the particular computing system, the specific data including trace data related to execution of the particular process at the execution point and container data identifying one or more distinct sets of kernel resources associated with the particular container. For example, kernel application 118 is caused to be executed in a kernel space of computing device 110. Application 118 stores both trace data and container data for a detected system call 114, e.g., in ring buffer 112, as described in further detail herein.

At step 344, based, at least in part, on the trace data in the one or more memory buffers, a running process is identified as running on a particular computing system. For example, the trace data from the ring buffer 112 includes information identifying a process for system call 114. At step 346, based on the specific data in the one or more memory buffers, a particular containerized application, of the particular container, is identified to be associated with the running process. For example, the container data from the ring buffer 112 includes information related to the container of the containerized application (e.g., application 112) or process, as described in further detail herein.

At step 348, one or more active software packages are identified to be associated with the particular containerized application. For example, information regarding an image of the particular containerized application, such as an SBOM, identifies one or more software packages for the identified containerized application.

At step 350, a set of active vulnerabilities, from a plurality of vulnerabilities, are identified as associated with the one or more active software packages, as described in further detail herein. At step 352, information regarding the set of active vulnerabilities and at least a portion of the container data is transmitted to a device for monitoring, auditing, and/or vulnerabilities management.

4.4 Real-Time Updates of Active Vulnerabilities

According to various embodiments, the set of active vulnerabilities may be identified based on system calls detected over a particular period of time. For example, an initial set of active vulnerabilities is established based on system call data gathered over a configurable amount of time (e.g., one day).

Furthermore, the set of active vulnerabilities identified for a system may be updated, periodically or in real time, based on continued monitoring of the system calls in the computing system. Real time updates to the set of active vulnerabilities identified for a system are updates that are performed substantially concurrently with detecting a system call that precipitates an adjustment to the active vulnerabilities set, e.g., within a real time threshold amount of time such as 10 milliseconds. Specifically, if a system call detected after compilation of the initial set of active vulnerabilities is associated with a computing asset that was not previously detected as active for the system, the list of active software packages is adjusted with the software packages associated with the newly-detected computing asset, and an updated list of active vulnerabilities is generated based on the adjusted list of active software packages.

5.0 Filtered Vulnerability Management Actions

Vulnerability management actions taken for vulnerabilities associated with assets of device 110 can be focused on the identified set of active vulnerabilities. By focusing remediation efforts on the active vulnerabilities, computing resources are used to address those vulnerabilities that have the most likelihood of affecting performance of the system. Vulnerability management actions that may be taken to address a particular active vulnerability include: applying one or more updates to a particular software package associated with the particular active vulnerability; adjusting a set of firewall rules, for the particular computing system, to prevent exploitation of the particular active vulnerability; sending information identifying the particular active vulnerability to a client computing device; and including information identifying the particular active vulnerability in a graphical user interface.

According to various embodiments, context metadata is gathered for the active vulnerabilities identified for a system, based on which the vulnerabilities of the system may be filtered for purposes of vulnerability management actions, as described in further detail below. Furthermore, the context metadata may also be gathered and maintained for "non-active" vulnerabilities, which are vulnerabilities identified for the system that are not associated with processes that have been detected running on the system. The context metadata for vulnerabilities may be stored in vulnerability records maintained by the system. Particular vulnerability management actions may be taken for a given vulnerability based on the vulnerability being classified as "active" and/or based on one or more context metadata values associated with the vulnerability. Context metadata for an active vulnerability may be (a) identified from information for one or more encapsulating entities—such as containers, container pods (a pod being a group of one or more containers, with shared storage and network resources), pod clusters, cloud deployments, etc.—that manage a computing asset associated with the active vulnerability, or (b) derived from the configuration of the encapsulating entity management systems with respect to the computing asset—such as firewall rules that may indicate that the computing asset is network-facing, etc.

Furthermore, context metadata for a given vulnerability may include runtime metadata for a process or application associated with the vulnerability. Runtime metadata may include how much time a process has run, how often an application has been executed, whether the process or application is currently running, etc. Thus, vulnerability management actions may be applied to vulnerabilities associated with processes or applications that are currently running. Furthermore, the status of a vulnerability may be changed, e.g., from "active" to "previously active", based on determining that a process or application associated with the vulnerability is not currently running on device 110.

Also, context metadata for a given vulnerability may further include vulnerability metadata, such as vulnerability severity, attack type, or availability of a solution for the vulnerability. Context metadata for an active vulnerability may further indicate the impetus for classifying the vulnerability as "active", such as being associated with a currently-running process, with a process that was known to have run within a threshold amount of time, with a process that was loaded into memory, or with a library that was identified based on runtime data (e.g., using argument data for a system call), etc.

Figure 4:
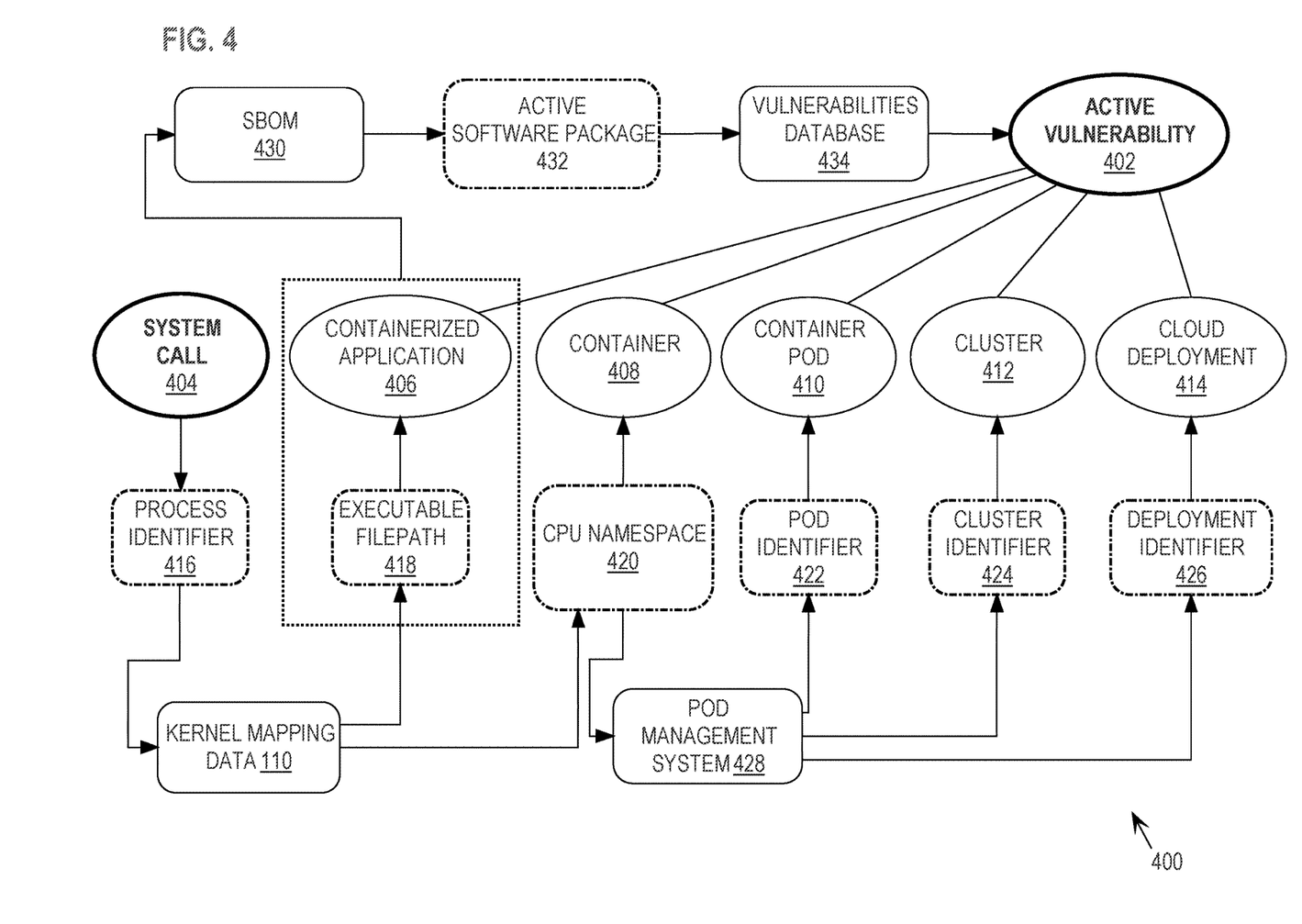
FIG. 4 depicts an example flowchart for identifying various levels of context metadata for an active vulnerability of a computing system.

FIG. 4 depicts an example flowchart 400 depicting information sources used to determine various levels of context metadata for an identified active vulnerability 402. As shown in flowchart 400, a system call 404 is detected by the computing system, which is associated with a process identifier 416. The process identifier 416 can be used to determine an executable filepath 418 for the system call using kernel mapping data 120. The executable filepath 418 can be then used to identify, within SBOM data 430, an active software package 432 that is mapped (in a vulnerabilities database 434) to active vulnerability 402.

Context metadata for an active vulnerability 402 may be from any level of granularity of asset management, e.g., at the process level (such as information from system call 404), the application level 406, the container level 408, the container pod level 410, the pod cluster level 412, the cloud deployment level 414, etc. Any level(s)/type of context metadata may be associated with an active vulnerability, and is not limited to the information types and levels in FIG. 4.

Further, any information may be included in the context metadata maintained for an active vulnerability, including labels associated with the various encapsulating entities associated with each of the metadata levels, such as container name, cluster name, namespace, cloud labels, etc. To illustrate, the process identifier 416 derived from the system call 404 may be associated with active vulnerability 402 as process-level context metadata. The executable filepath 418 can be used to identify a containerized application that is associated with the system call 404, information for which may be associated with active vulnerability 402 as containerized application-level metadata 406.

Furthermore, mapping data 120 indicates whether a particular process (identified by the process identifier 416) is associated with a CPU namespace 420, which is used to identify resources of a container within device 110. Any process that is associated with a CPU namespace is associated with a container on the computing system. A CPU namespace 420 may be used to obtain a corresponding container identifier (as discussed in detail in the "Programmatic Container Monitoring" application incorporated by reference above), which may be used to determine one or more properties of the container of the computing asset that owns the identified process. For example, the container identifier may be used to obtain, from the container runtime environment, container metadata such as the container image, container name, container status, etc. Any portion of this container-level information may be used as container-level context metadata 408 for active vulnerability 402 (and for any other active vulnerabilities that are associated with the container identifier and/or CPU namespace 420).

When applicable, the CPU namespace 420 may be used to identify higher-level metadata for the active vulnerability 402, such as pod context metadata 410, which can then be used to retrieve cluster metadata 412 and/or cloud deployment metadata 414, etc. For example, a pod management system 428 (such as Kubernetes) exposes an application programming interface (API). Using the API, pod metadata 410 (such as pod name, pod namespace, etc.) that is associated with CPU namespace 420 may be retrieved. A pod cluster identifier 424 or cloud deployment identifier 426 (e.g., retrieved from pod management system 428) may be used to retrieve cluster-level metadata 412 and/or deployment-level metadata 414 for the active vulnerability 402.

In some embodiments, the context metadata identified for vulnerabilities is accessible to user devices together with information identifying the active vulnerabilities. A user may identify one or more criteria for particular vulnerability management actions that refer to context metadata of the list of active vulnerabilities, where vulnerability management actions are performed for a given active vulnerability based on the vulnerability satisfying one or more criteria associated with the actions. For example, a user may identify additional criteria for targeted software package update-type actions (described below) indicating that such actions are only performed for active vulnerabilities that are associated with context metadata indicating a cloud deployment type of "production". In this example, active vulnerabilities for assets with other cloud deployment types, such as "testing", are not managed using the update-type actions.

Thus, using criteria that is based on the context metadata maintained for active vulnerabilities, a user has finer control as to how the active vulnerabilities are addressed. Vulnerabilities that do not satisfy the additional criteria may not need to be addressed, or may not need to have all potential vulnerability management actions performed for the vulnerability, which further reduces the computing resources required to address the active vulnerabilities identified for the computing system.

Furthermore, prioritized vulnerabilities may be further ranked based on context metadata of the vulnerabilities, where the order of vulnerability remediation can be based on the rankings of the prioritized vulnerabilities. For example, preference data may identify "active" vulnerabilities in a "production" cloud deployment (as indicated in context metadata for the vulnerabilities) are identified as prioritized, and the user ranks the prioritized vulnerabilities based on severity values in the vulnerability metadata and then based on a provided ranking of container pods (where container pods ranking is provided by a user). In this example, among the prioritized vulnerabilities, there vulnerabilities associated with three container pod identifiers (A-rank 1, B-rank 2, and C-rank 3), and two vulnerability severity values (critical and high). The vulnerabilities are ranked as follows, with the pertinent context metadata values identified as [severity, pod identifier]: [critical, A]; [critical, B]; [critical, C]; [high, A]; [high, B]; and [high, C]. Thus, vulnerability management actions will be performed for the critical vulnerabilities associated with pod A, then for the critical vulnerabilities associated with pod B, and so on.

5.1 Targeted Software Package Updates

According to various embodiments, a vulnerability management action taken for an active vulnerability is to automatically update the software package that is subject to the vulnerability. For example, the vulnerability database includes, for a given vulnerability, information identifying a patch for the software package. Device 110 automatically retrieves the patch and automatically applies the patch to the software package immediately or at a scheduled time when it is determined that the software package is not being utilized. Based on successful application of the software package, device 110 updates the list of "active" software packages to reflect the new version of the software package effected by the patch update. Furthermore, the list of "active" vulnerabilities is updated to reflect any vulnerabilities associated with the new version of the software package. Any vulnerabilities that were addressed by the patch update are either removed from the list or marked as "addressed".

5.2 Targeted Security Measures

According to various embodiments, a vulnerability management action taken for an active vulnerability is to automatically adjust the firewall rules for a firewall of device 110 to identify and/or prevent any attacks that are configured to target the active vulnerability. For example, the vulnerability database includes, for a given vulnerability, information indicating a manner of exploitation of the vulnerability. For example, the vulnerability database indicates that a particular vulnerability allows for a denial of service attack on a particular port. Using the information indicating the manner of exploitation of the vulnerability, device 110 automatically adjusts the firewall rules to identify and/or prevent the particular manner of exploitation. To illustrate given the example denial of service attack information, the firewall rules may be configured to detect denial of service attack patterns at the indicated port and drop packets that conform to denial of service attack patterns.

As another example, the vulnerability database indicates that a particular vulnerability allows for a data leak using a particular port and a particular network protocol, or a particular functionality of a network protocol. Using the information indicating the manner of exploitation of the vulnerability, device 110 automatically adjusts the firewall rules to identify and/or prevent the particular manner of exploitation. To illustrate given the example network data leak attack information in the vulnerabilities database, the firewall rules may be configured to detect the use of the particular protocol at the indicated port and to drop packets that conform to the specific usage of the particular protocol identified in the database as triggering the vulnerability.

According to various embodiments, any vulnerabilities that were mitigated by the update to the firewall rules are marked as "addressed".

5.3 Targeted Vulnerability Communication

According to various embodiments, a vulnerability management action taken for an active vulnerability is to automatically communicate information for the vulnerability to a particular client device. For example, device 110 maintains preference information that identifies a client device with which to communicate active vulnerability information. Computing device 110 automatically sends information identifying the active vulnerability, e.g., a CPE of the vulnerability and one or more values of context metadata for the vulnerability, to the identified client device. For example, the client device runs a client application (such as a webpage in a browser, an email client, a text client, a vulnerability management client application, etc.) that receives, from computing device 110, the vulnerability information and causes display of the vulnerability information at the client device. The information communicated to a client device can be pre-filtered based on the preference information. For example, instead of receiving data related to all active vulnerabilities, the preference information might specify receiving alerts only for those active vulnerabilities above a particular severity threshold that are run on a particular cluster node.

5.4 Graphical User Interface with Active Vulnerability Filtering

According to various embodiments, a vulnerability management action taken for an active vulnerability is to automatically display, at a display device, a graphical user interface (GUI) that allows a user to filter vulnerabilities of a system based on vulnerability status (e.g., "active" or "non-active") and/or based on one or more additional context metadata values maintained for the vulnerabilities. For example, computing device 110 generates GUI information that, when processed, causes display of the GUI, and transmits the GUI information to a client computing device. The GUI comprises filtering capabilities that allows a user to filter vulnerabilities associated with a computing system based on context metadata and/or status of the vulnerabilities.

The GUI may be updated in real-time as further runtime data related to vulnerabilities becomes available within the target computing system. For example, the GUI may include a messages section that is populated with information regarding newly-identified active vulnerabilities. Furthermore, the GUI may display a list of vulnerabilities that satisfy particular user criteria. When a new active vulnerability is identified that satisfies the criteria, the list may be automatically updated to reflect the new active vulnerability in real time. The new vulnerability may be visually highlighted to identify it as newly-added.

According to various embodiments, the GUI includes one or more GUI controls that identify one or more vulnerability management actions to be performed for one or more vulnerabilities displayed in the GUI. For example, a user may highlight one or more vulnerabilities displayed in the GUI and activate a GUI control that causes one or more of the following to be performed for the highlighted vulnerabilities: applying one or more updates to one or more software packages associated with the highlighted vulnerabilities; adjusting a set of firewall rules, for the computing system, to prevent exploitation of the highlighted vulnerabilities; and/or sending information identifying the highlighted vulnerabilities to a client computing device. As a further example, the GUI includes a GUI control that, when activated, causes a list of vulnerabilities identified for the particular computing system to be displayed in the graphical user interface, the list of vulnerabilities satisfying particular criteria associated with the control. For example, the GUI control may be configured to display all "active" vulnerabilities with a severity of "critical" that are associated with containerized applications in a "production" cloud deployment. The criteria associated with such a one-click search control may be configured by a user.

6.0 Computer Component Background

6.1 Containers

Programmatic containers ("containers") encapsulate computer program ("containerized") applications within individual, relatively isolated runtime environments. For example, a container may bundle into a single package an application program with its dependencies, libraries, and configuration files. A container uses the operating system kernel of its host computer, unlike a virtual machine instance that includes an entire operating system that runs on top of the operating system kernel of its host computer. A computer program application may be deployed at one or more times as a set of containers. Furthermore, each container may include a set of code that exhibits simplified dependencies and/or is otherwise streamlined for performance efficiency.

According to various embodiments, a computing system maintains a container registry identifying one or more computing assets that are managed as part of a container.

6.2 Monitoring Component

In some embodiments, a monitoring component communicates with or includes a virtual machine that runs safe computer programs on behalf of a user in the kernel space. The virtual machine exposes to the user a virtual processor, with a custom set of virtual machine instructions as well as a set of registers and a stack memory area. Upon receiving a computer program using the custom set of instructions ("virtual machine program"), the virtual machine verifies that the code satisfies certain safety criteria, such as the absence or proper termination of functional loops or the absence of invalid memory access. The verification can include simulating the execution of the computer program one instruction at a time within the virtual machine. On the other hand, the kernel allows computer programs to be attached to various execution points to receive relevant data coming from the execution points. For example, a computer program can be attached to a system call invoked by any monitored application running in the user space. When the monitored application invokes the system call, the computer program can be run in the kernel to receive arguments to the system call. The virtual machine then allows a virtual machine program attached to an execution point to be executed directly in the kernel when an application or process reaches the execution points. The virtual machine would typically cause compilation of the computer program into the kernel code before running the computer program directly in the kernel. The virtual machines can ensure that the monitored process is stopped while the computer program is run to minimize the probability of reading corrupted data without requiring locking synchronization.

According to various embodiments, the monitoring component running in the user space communicates with a virtual machine that has a custom set of instructions and verifies a computer program written in the virtual machine code before running the computer program in the kernel space. The monitoring component selects one or more execution points from which trace data is to be gathered. For example, one execution point could be the entry of a system call, as described above. The monitoring component then causes one or more computer programs written in virtual machine code to be loaded into the virtual machine. The one or more computer programs are to be attached to the one or more execution points. The one or more computer programs can contain similar instructions, or they can contain different instructions specific to individual execution points. Through the attachment, the monitoring component can further cause the one or more computer programs compiled into kernel code to be executed in the kernel space when running applications, including containerized applications, reach the one or more execution points during their execution.

According to various embodiments, each of the computer programs stores trace data related to execution of a containerized application or process that has triggered execution of the computer program. For example, where the execution point is the entry of a system call, the trace data could include arguments to the system call. The trace data could also include additional contextual information related to memory counters, page faults, socket queues, and so on. In addition, as container data related to the container of the containerized application or process is not typically included in the call stack for the computer program running in the kernel space, the computer program could obtain such container data via direct access of certain kernel data structures without causing invalid memory access (as discussed in detail in the "Programmatic Container Monitoring" application incorporated by reference above). The computer program could save the trace data and the container data in one or more memory buffers directly managed by the kernel and shared by the kernel space and the user space for retrieval by the monitoring component. An example of such a memory buffer is a per-CPU ring buffer large enough to accommodate all the trace data and container data generated by the one or more computer programs during execution of the containerized application or process. According to various embodiments, the monitoring component retrieves data stored by the one or more computer programs in the one or more memory buffers.

According to various embodiments, the monitoring component causes loading of one or more computer programs to the virtual machine and attachment of these one or more computer programs to one or more execution points. The monitoring component can also store control messages in the one or more memory spaces for retrieval by the one or more computer programs, as discussed above. The monitoring component can retrieve data saved by the attached computer programs in the one or more memory spaces upon request, according to a specific schedule, or in response to certain triggers. The monitoring component can further analyze the retrieved data and report the retrieved data or analysis results to a user device.

For example, kernel application 118 is implemented by one or more processes of a virtual machine that exposes to the user space a virtual processor, with a custom set of virtual machine instructions as well as a set of registers and a stack memory area. For further example, kernel application 118 represents an improvement of the extended Berkeley Packet Filter ("eBPF") provides the virtual machine as discussed above. An eBPF program, i.e., a computer program in eBPF bytecode, could be attached to certain operations or conditions during execution of a monitored application, such as tracepoints or kprobes.

For further example, when an application or process reaches one of the execution points to which the computer program is attached, the kernel application 118 is then executed in the kernel. The kernel application 118 receives as arguments some relevant data coming from the execution point. The kernel application 118 can then store the relevant data to a per-CPU ring buffer managed by the Linux operating system, e.g., having a size of at least 8 MB.

To illustrate in the context of FIG. 1, a monitoring component 114 running in the user space loads a kernel application 118 into the eBPF virtual machine and attaches the kernel application 118 to a tracepoint or a kprobe for system call 114. The tracepoint or kprobe may correspond to the entry or exit of a system call 114. At run time, when an application 112 to be monitored makes a system call 114, the kernel application 118 could be invoked via the tracepoint. The kernel application 118 can receive or store control messages or other values in a kernel mapping data 120. The kernel application 118 can then also store the arguments with which it was invoked, additional data in the call stack, and container data stored in certain kernel data structures in the kernel mapping data 120 or directly in a ring buffer 112.

7.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
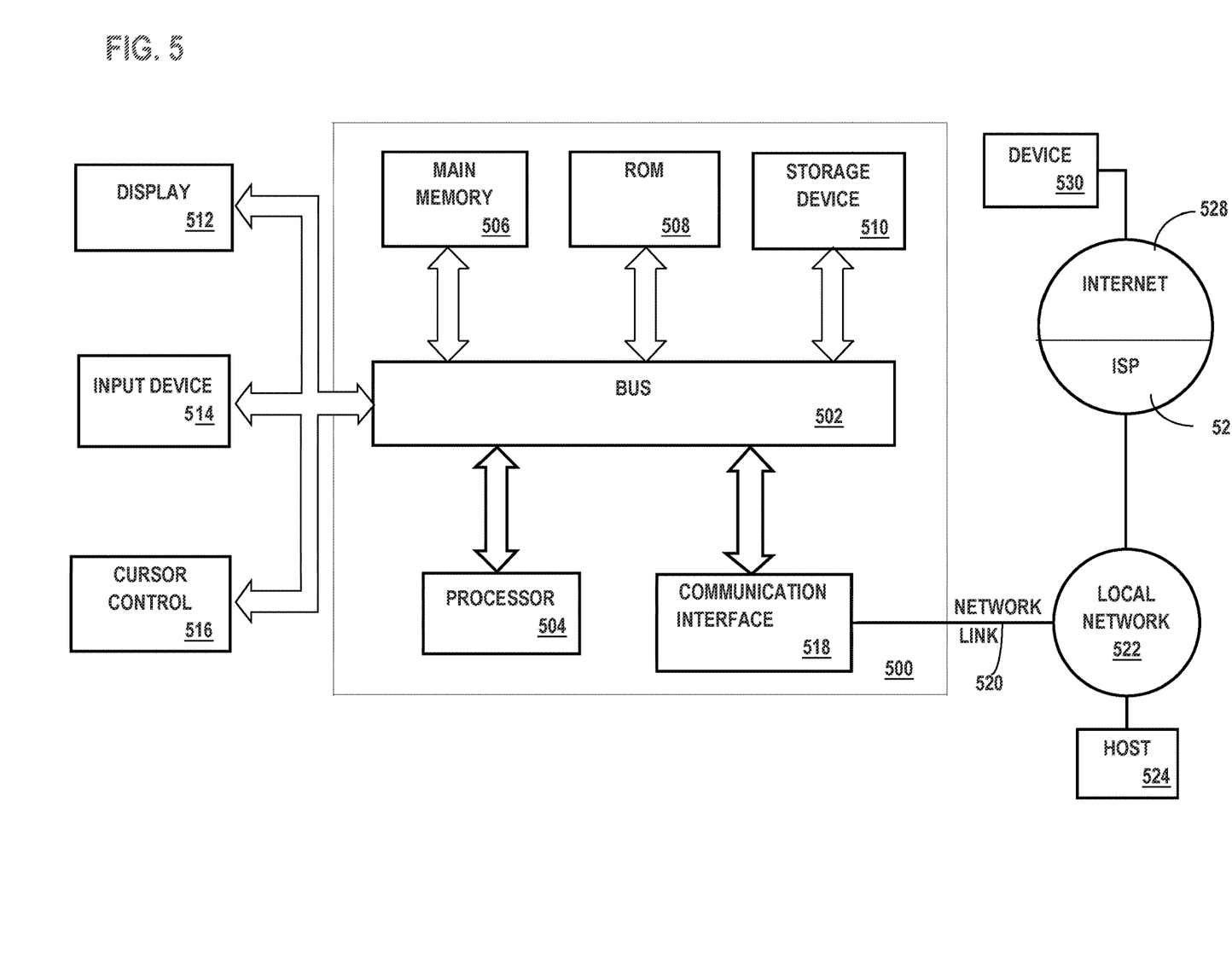
FIG. 5 depicts a computer system upon which an embodiment may be implemented.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of computer vulnerabilities management, comprising:
    identifying one or more processes running on a particular computing system during a particular period of time including now;
    wherein a plurality of computing assets, associated with a plurality of software packages, is installed on the particular computing system;
    wherein the plurality of software packages is associated with a plurality of vulnerabilities;
    identifying one or more active computing assets, of the plurality of computing assets, based on each of the one or more active computing assets being an owner of a process of the one or more processes;
    identifying a set of active software packages, of the plurality of software packages, associated with the one or more active computing assets;
    identifying, from the plurality of vulnerabilities, a set of active vulnerabilities that are associated with the set of active software packages;
    prioritizing the set of active vulnerabilities over other vulnerabilities in the plurality of vulnerabilities;
    obtaining and maintaining, for each vulnerability of the set of active vulnerabilities, context metadata that comprises metadata for one or more encapsulating entities of a plurality of encapsulating entities, including one or more containers that are associated with the one or more active computing assets that are associated with the set of active vulnerabilities;
    ranking the set of active vulnerabilities based on the metadata for the corresponding one or more containers for each vulnerability of the set of active vulnerabilities;
    transmitting information related to the prioritizing and ranking to a device.

2. The computer-implemented method of claim 1, wherein said identifying the one or more processes running on the particular computing system comprises:

causing a computer program to be executed in a kernel space of the particular computing system when execution of a particular process, of the one or more processes, that is associated with a particular container of a plurality of containers reaches an execution point,
    each of the plurality of containers being associated with a distinct set of resources of a kernel of the kernel space,
    the computer program storing specific data in one or more memory buffers managed directly by the kernel and shared by the kernel space and a user space of the particular computing system,
    the specific data including trace data related to execution of the particular process at the execution point; and
identifying the particular process, of the one or more processes, based on the trace data from the one or more memory buffers.

3. The computer-implemented method of claim 2, wherein:
the specific data further includes container data related to the particular container;
said identifying the one or more active computing assets further comprises, based, at least in part, on the container data from the one or more memory buffers, identifying a containerized application residing in the particular container as a particular active computing asset of the one or more active computing assets.

4. The computer-implemented method of claim 3, further comprising, for a particular active vulnerability of the set of active vulnerabilities that is associated with the particular active computing asset, performing one or more vulnerability management actions based, at least in part, on the container data.

5. The computer-implemented method of claim 1, further comprising:
detecting a particular system call by a particular process on the particular computing system;
wherein the system call includes argument information identifying a particular object or file;
determining that the particular object or file is associated with a particular software package; and
based, at least in part, on said determining that the particular object or file is associated with the particular software package, identifying the particular software package as an active software package for the particular computing system;
identifying, from the plurality of vulnerabilities, one or more active vulnerabilities that are associated with the particular software package; and
transmitting information for the one or more active vulnerabilities to a device.

6. The computer-implemented method of claim 1, further comprising updating the set of active vulnerabilities in real-time by:
identifying an additional process, other than the one or more processes, running on the particular computing system;
identifying an additional active computing asset, of the plurality of computing assets other than the one or more active computing assets, based on the additional active computing asset being the owner of the additional process;
identifying an additional active software package, of the plurality of software packages, associated with the additional active computing asset; and
identifying, from the plurality of vulnerabilities, an additional active vulnerability other than the set of active vulnerabilities, that is associated with the additional active software package.

7. The computer-implemented method of claim 6, further comprising performing one or more vulnerability management actions in real time for the additional active vulnerability.

8. The computer-implemented method of claim 1,
the context metadata further comprising runtime metadata for a process or application associated with the vulnerability,
the runtime metadata including for how much time a process has run, how often an application has been executed, or when in the particular period of time a process was, is, or will be running.

9. The computer-implemented method of claim 1, further comprising, for a particular active vulnerability of the set of active vulnerabilities, performing one or more vulnerability management actions of a set of vulnerability management actions comprising one or more of:
applying one or more updates to a particular software package associated with the particular active vulnerability;
adjusting a set of firewall rules, for the particular computing system, to prevent exploitation of the particular active vulnerability;
sending information identifying the particular active vulnerability to a client computing device; or
including information identifying the particular active vulnerability in a graphical user interface.

10. The computer-implemented method of claim 9, further comprising identifying the particular active vulnerability based on one or more vulnerability preference criteria, including one or more context metadata values of the particular active vulnerability.

11. The computer-implemented method of claim 10, further comprising:
ranking a set of vulnerabilities that satisfy the one or more vulnerability preference criteria based on one or more ranking criteria based on context metadata of the set of vulnerabilities; and
performing the one or more vulnerability management actions on the set of vulnerabilities based, at least in part, on rankings of the set of vulnerabilities.

12. The computer-implemented method of claim 9, wherein the one or more vulnerability management actions comprises applying one or more updates to a particular software package associated with the particular active vulnerability.

13. The computer-implemented method of claim 9, wherein the one or more vulnerability management actions comprises adjusting a set of firewall rules, for the particular computing system, to prevent exploitation of the particular active vulnerability.

14. The computer-implemented method of claim 9, wherein the one or more vulnerability management actions comprises sending information identifying the particular active vulnerability to the client computing device.

15. The computer-implemented method of claim 9, wherein the one or more vulnerability management actions comprises including information identifying the particular active vulnerability in a graphical user interface, the method further comprising:
generating graphical user interface information that, when processed, causes display of the graphical user interface; and transmitting the graphical user interface information to a client computing device.

16. The computer-implemented method of claim 15, wherein:
the graphical user interface includes a list of active vulnerabilities, of the set of active vulnerabilities, that include the particular active vulnerability and that satisfy particular criteria;
the method further comprises:
identifying a second active vulnerability that (a) satisfies the particular criteria and (b) was added to the set of active vulnerabilities after compiling the list of active vulnerabilities, and
updating the graphical user interface, in real time, to reflect the second active vulnerability.

17. The computer-implemented method of claim 15, further comprising:
maintaining, for one or more active vulnerabilities of the set of active vulnerabilities, context metadata that comprises metadata for one or more encapsulating entities associated with one or more computing assets that are associated with the one or more active vulnerabilities;
wherein the graphical user interface includes a list of active vulnerabilities, of the set of active vulnerabilities, that include the particular active vulnerability and that satisfy particular criteria based on at least one context metadata value of the context metadata.

18. The computer-implemented method of claim 15, wherein the graphical user interface includes a control that, when activated, causes a list of vulnerabilities identified for the particular computing system to be displayed in the graphical user interface, the list of vulnerabilities satisfying particular criteria associated with the control.

19. The computer-implemented method of claim 15, wherein the graphical user interface includes a list of vulnerabilities that comprises: (a) one or more active vulnerabilities, of the set of active vulnerabilities, that include the particular active vulnerability, and (b) one or more non-active vulnerabilities.

20. The computer-implemented method of claim 15, wherein the graphical user interface comprises one or more controls that, when activated, cause one or more vulnerability management actions to be performed for the particular active vulnerability.

21. One or more non-transitory computer-readable media storing instructions that, when executed by one or more processors, cause:
identifying one or more processes running on a particular computing system during a particular period of time including now;
wherein a plurality of computing assets, associated with a plurality of software packages, is installed on the particular computing system;
wherein the plurality of software packages is associated with a plurality of vulnerabilities;
identifying one or more active computing assets, of the plurality of computing assets, based on each of the one or more active computing assets being an owner of a process of the one or more processes;
identifying a set of active software packages, of the plurality of software packages, associated with the one or more active computing assets;
identifying, from the plurality of vulnerabilities, a set of active vulnerabilities that are associated with the set of active software packages;
prioritizing the set of active vulnerabilities over other vulnerabilities in the plurality of vulnerabilities;
obtaining and maintaining, for each vulnerability of the set of active vulnerabilities, context metadata that comprises metadata for one or more encapsulating entities of a plurality of encapsulating entities, including one or more containers that are associated with the one or more active computing assets that are associated with the set of active vulnerabilities;
ranking the set of active vulnerabilities based on the metadata for the corresponding one or more containers for each vulnerability of the set of active vulnerabilities; transmitting information related to the prioritizing and ranking to a device.

* * * * *